US012438156B2

(12) United States Patent
Kong et al.

(10) Patent No.: US 12,438,156 B2
(45) Date of Patent: Oct. 7, 2025

(54) ELECTRODES INCLUDING POLYMER BINDER NETWORKS WITH BAMBOO-TYPE FIBERS

(71) Applicant: GM GLOBAL TECHNOLOGY OPERATIONS LLC, Detroit, MI (US)

(72) Inventors: Dewen Kong, Shanghai (CN); Meiyuan Wu, Shanghai (CN); Haijing Liu, Shanghai (CN); Si Chen, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 565 days.

(21) Appl. No.: 17/884,214

(22) Filed: Aug. 9, 2022

(65) Prior Publication Data

US 2023/0231141 A1    Jul. 20, 2023

(30) Foreign Application Priority Data

Jan. 14, 2022  (CN) .......................... 202210042360.2

(51) Int. Cl.
*H01M 4/62* (2006.01)
*H01M 4/02* (2006.01)

(52) U.S. Cl.
CPC ...... *H01M 4/623* (2013.01); *H01M 2004/021* (2013.01)

(58) Field of Classification Search
CPC .. H01M 4/623; H01M 2004/021; H01M 4/02; H01M 4/0404; H01M 4/043; H01M 4/13; H01M 4/134
See application file for complete search history.

(56) References Cited

U.S. PATENT DOCUMENTS

| 10,714,756 B2 | 7/2020 | Dai et al. |
| 10,741,812 B2 | 8/2020 | Luski et al. |

(Continued)

FOREIGN PATENT DOCUMENTS

| CN | 102142560 A | 8/2011 |
| CN | 108470909 A | 8/2018 |

(Continued)

OTHER PUBLICATIONS

Hippauf, Felix et al., "Overcoming binder limitations of sheet-type solid-state cathodes using a solvent-free dry-film approach", 2019, Elsevier, pp. 390-398 (Year: 2019).*

(Continued)

*Primary Examiner* — Ula C Ruddock
*Assistant Examiner* — Sydney L Kline
(74) *Attorney, Agent, or Firm* — Harness, Dickey & Pierce, P.L.C.

(57) ABSTRACT

The present disclosure provides an electrode for an electrochemical cell. The electrode includes a polymer binder network and a plurality of electroactive material particles. The polymer binder network includes a plurality of fibers defining the polymer binder network. Each of the plurality of fibers includes a plurality of beads and a plurality of filaments. The plurality of filaments extends from at least a portion of the plurality of beads, respectively. The plurality of electroactive material particles is in voids of the polymer binder network. In certain aspects, the present disclosure provides a single- or double-sided electrode component including a current collector and the electrode.

20 Claims, 7 Drawing Sheets

(56) References Cited

U.S. PATENT DOCUMENTS

| | | | |
|---|---|---|---|
| 10,950,836 | B2 | 3/2021 | Xiao et al. |
| 11,121,375 | B2 | 9/2021 | Hou et al. |
| 11,145,922 | B2 | 10/2021 | Li et al. |
| 11,205,798 | B2 | 12/2021 | Li et al. |
| 11,217,826 | B2 | 1/2022 | Li et al. |
| 11,295,901 | B2 | 4/2022 | Hou et al. |
| 11,316,142 | B2 | 4/2022 | Jiang et al. |
| 11,374,257 | B2 | 6/2022 | Hou et al. |
| 11,404,714 | B2 | 8/2022 | Hou et al. |
| 11,539,071 | B2 | 12/2022 | Li et al. |
| 2008/0089012 | A1* | 4/2008 | Kon ............ H01G 11/28 361/502 |
| 2018/0205114 | A1* | 7/2018 | Pauric ............ H01M 4/80 |
| 2019/0190012 | A1 | 6/2019 | Wu et al. |
| 2020/0251740 | A1* | 8/2020 | Mukai ............ H01M 50/4295 |
| 2020/0269207 | A1* | 8/2020 | Zafiropoulos ........ H01M 4/625 |
| 2020/0403267 | A1 | 12/2020 | Li et al. |
| 2021/0020929 | A1 | 1/2021 | Kong et al. |
| 2021/0036310 | A1 | 2/2021 | Hou et al. |
| 2021/0050596 | A1 | 2/2021 | Li et al. |
| 2021/0057776 | A1 | 2/2021 | Lu et al. |
| 2021/0109136 | A1 | 4/2021 | Hao |
| 2021/0111426 | A1 | 4/2021 | Li et al. |
| 2021/0135224 | A1 | 5/2021 | Hou et al. |
| 2021/0151761 | A1 | 5/2021 | Jimenez et al. |
| 2021/0408518 | A1 | 12/2021 | Wang et al. |
| 2022/0037642 | A1 | 2/2022 | Ellison et al. |
| 2022/0102756 | A1 | 3/2022 | Frieberg et al. |
| 2022/0123352 | A1 | 4/2022 | Li et al. |
| 2022/0140422 | A1 | 5/2022 | Chen et al. |
| 2022/0166031 | A1 | 5/2022 | Li et al. |
| 2022/0173370 | A1 | 6/2022 | Kong et al. |
| 2022/0173377 | A1 | 6/2022 | Kong et al. |
| 2022/0181598 | A1 | 6/2022 | Lu et al. |
| 2022/0181685 | A1 | 6/2022 | Li et al. |
| 2022/0238885 | A1 | 7/2022 | Koestner et al. |
| 2022/0263055 | A1 | 8/2022 | Hou et al. |
| 2022/0263129 | A1 | 8/2022 | Lu et al. |
| 2022/0302526 | A1 | 9/2022 | Li et al. |
| 2022/0407079 | A1 | 12/2022 | Lu et al. |
| 2023/0015143 | A1 | 1/2023 | Su et al. |
| 2023/0024667 | A1 | 1/2023 | Li et al. |
| 2023/0025830 | A1 | 1/2023 | Su et al. |
| 2023/0046608 | A1 | 2/2023 | Su et al. |
| 2023/0155108 | A1 | 5/2023 | Jiang et al. |
| 2023/0387381 | A1 | 11/2023 | Li et al. |

FOREIGN PATENT DOCUMENTS

| | | |
|---|---|---|
| CN | 113767486 A | 12/2021 |
| CN | 116487586 A | 7/2023 |
| DE | 102022118608 A1 | 7/2023 |

OTHER PUBLICATIONS

Stéven Renault et al.; "A Green Li-Organic Battery Working as a Fuel Cell in Case of Emergency"; Electronic Supplementary Material (ESI) for Energy & Environmental Science; The Royal Society of Chemistry; Jul. 2013; 6 pages.

Xiang Liu et al.; "Thermal Runaway of Lithium-Ion Batteries without Internal Short Circuit"; Joule 2; Oct. 17, 2018; pp. 2047-2064.

Hyung-Joo Noh et al.; "Comparison of the structural and electrochemical properties of layered Li[NixCoyMnz]O2 (x = 1/3, 0.5, 0.6, 0.7, 0.8 and 0.85) cathode material for lithium-ion batteries"; Journal of Power Sources 233; Jan. 19, 2013; pp. 121-130.

Nicola Michael Jobst et al.; "Ternary Cathode Blend Electrodes for Environmentally Friendly Lithium-Ion Batteries"; ChemSusChem 2020, 13; Wiley Online Library; pp. 3928-3936.

Meng Jiang et al.; U.S. Appl. No. 17/526,762, filed Nov. 15, 2021, entitled "Methods for Making Thick Multilayer Electrodes"; 52 pages.

Qili Su et al.; U.S. Appl. No. 17/710,900, filed Mar. 31, 2022, entitled "Gel Electrolyte System For Solid State Battery"; 76 pages.

Zhe Li et al.; U.S. Appl. No. 17/869,580, filed Jul. 20, 2022, entitled "Sulfide-Impregnated Columnar Silicon Anode For All-Solid-State Battery And Method Of Forming The Same"; 49 pages.

Qi Lu et al.; U.S. Appl. No. 17/698,865, filed Mar. 18, 2022, entitled "Bipolar Current Collector and Method of Making the Same"; 48 pages.

Qili Su et al.; U.S. Appl. No. 17/697,135, filed Mar. 17, 2022, entitled "Methods of Manufacturing Bipolar solid-State Batteries"; 77 pages.

Qili Su et al.; U.S. Appl. No. 17/688,445, filed Mar. 7, 2022, entitled "Methods of Fabricating Bipolar Solid State Batteries"; 77 pages.

Zhe Li et al.; U.S. Appl. No. 17/707,524, filed Mar. 29, 2022, entitled "Argyrodite Solid Electrolytes for Solid-State Batteries and Methods of Making the Same"; 56 pages.

First Office Action for Chinese Patent Application No. 202210042360.2 issued Jul. 16, 2025, with correspondence from China Patent Agent (H.K.) Ltd summarizing Office Action; 9 pages.

* cited by examiner

ELECTRODES INCLUDING POLYMER BINDER NETWORKS WITH BAMBOO-TYPE FIBERS

CROSS-REFERENCE TO RELATED APPLICATIONS

This application claims the benefit of Chinese Patent Application No. 202210042360.2 filed on Jan. 14, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electrodes, such as for use in electrochemical cells, including polymer binder networks including bamboo-type fibers.

Electrodes for lithium ion batteries or electrical cells may have a high loading density of electroactive materials to increase overall cell energy density. For example, thicker electroactive material layers and/or greater loading of electroactive materials increases a relative amount of electroactive materials relative to inert materials present in the electrochemical cell, such as current collectors and separators. However, performance of thick electrodes may be hindered by limited lithium ion passageways between electrolyte and/or electroactive material, physiochemical changes to the polymer binder during the solvent evaporation, for example.

SUMMARY

In various aspects, the present disclosure provides an electrode for an electrochemical cell. The electrode includes a polymer binder network and a plurality of electroactive material particles. The polymer binder network includes a plurality of fibers defining the polymer binder network. Each of the plurality of fibers includes a plurality of beads and a plurality of filaments. The plurality of filaments extends from at least a portion of the plurality of beads, respectively. The plurality of electroactive material particles is in voids of the polymer binder network.

In one aspect, each of the plurality of fibers includes a plurality of segments. Each of the plurality of segments includes a first portion and a second portion. The first portion includes the plurality of beads. The second portion includes the plurality of filaments.

In one aspect, each of the plurality of segments defines a length of greater than or equal to about 0.1 μm to less than or equal to about 50 μm.

In one aspects, each of the plurality of segments includes a substantially cylindrical wall defining an interior region. The substantially cylindrical wall includes, the first portion including the plurality of beads and the second portion including the plurality of filaments.

In one aspect, the substantially cylindrical wall defines a diameter of greater than or equal to about 0.1 μm to less than or equal to about 500 μm.

In one aspect, each of the plurality of fibers defines a length of greater than or equal to about 5 μm to less than or equal to about 2 cm.

In one aspect, each of the plurality of beads defines a diameter of greater than or equal to about 10 nm to less than or equal to about 1 μm. Each of the plurality of filaments defines a diameter of greater than or equal to about 1 nm to less than or equal to about 300 nm.

In one aspect, the electrode defines a thickness of greater than or equal to about 100 μm to less than or equal to about 2 mm.

In one aspect, the polymer binder network is present at greater than or equal to about 0.5 weight percent to less than or equal to about 10 weight percent.

In one aspect, the electrode has an areal capacity of greater than or equal to about 5 mAh/cm$^2$ to less than or equal to about 50 mAh/cm$^2$.

In one aspect, (i) the plurality of electroactive material particles comprise a positive electroactive material and the electrode has a press density of greater than or equal to about 2 g/cm$^3$ to less than or equal to about 4 g/cm$^3$, or (ii) the plurality of electroactive material particles comprise a negative electroactive material and the electrode has a press density of greater than or equal to about 1 g/cm$^3$ to less than or equal to about 3 g/cm$^3$.

In one aspect, the electrode defines a porosity of greater than or equal to about 25 volume percent to less than or equal to about 60 volume percent.

In one aspect, at least a portion of the plurality of beads are configured to be fibrillated during cycling of an electrochemical cell including the electrode.

In one aspect, the polymer binder network comprises polytetrafluoroethylene (PTFE).

In one aspect, the electrode further includes an electrically-conductive material.

In one aspect, the plurality of electroactive material particles includes one of: (i) a positive electroactive material selected from the group consisting of: an olivine compound, a rock salt, cobalt-free layered oxide, a rock salt layered oxide, a spinel, a tavorite, a borate, a silicate, an organic compound, sulfur, or any combination thereof, or (ii) a negative electroactive material selected from the group consisting of: The a carbonaceous material, a lithium-containing material, a tin-containing material, a lithium titanium oxide, a metal oxide, a metal sulfide, a silicon-containing material, a lithiated silicon-containing material, or any combination thereof.

In various aspects, the present disclosure provides an electrode component. The electrode component includes a current collector and an electrode layer. The current collector includes an electrically-conductive material. The electrode layer is on the current collector. The electrode layer includes a polymer binder network and a plurality of electroactive material particles. The polymer binder network includes a plurality of fibers. The plurality of fibers defines the polymer binder network. Each of the plurality of fibers includes a plurality of beads and a plurality of filaments. The plurality of filaments extends from at least a portion of the plurality of beads, respectively. The plurality of electroactive material particles is in voids of the binder polymer network.

In one aspect, the current collector includes a mesh and the electrode layer is in direct contact with the mesh.

In one aspect, the electrode component further includes an electrically-conductive adhesive between the current collector and the electrode layer.

In various aspects, the present disclosure provides a method of making an electrode for an electrochemical cell. The method includes preparing an admixture by admixing a plurality of electroactive material particles with a plurality of polymer binder fibers. Each of the plurality of polymer binder fibers includes a plurality of beads and a plurality of filaments extending from at least a portion of the plurality of beads. The method further includes depositing the admixture onto a substrate. The method further includes pre-rolling the admixture on the substrate to form a film precursor comprising the admixture and defining a first thickness. The method further includes forming the electrode by final-rolling the film precursor to define a second thickness less than the first thickness.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a schematic illustration of a fiber of the polymer binder network of

FIG. 4 according to various aspects of the present disclosure;

In the drawings, reference numbers may be reused to identify similar and/or identical elements.

DETAILED DESCRIPTION

Figure 1:
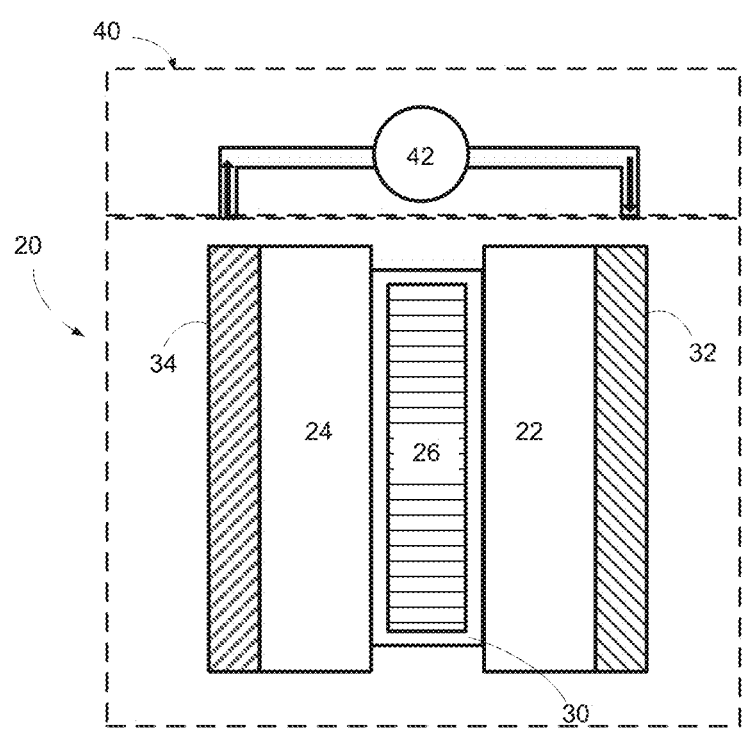
FIG. 1 is a schematic illustration of an electrochemical cell for cycling lithium ions.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to rechargeable lithium-ion batteries, which may be used in vehicle applications. However, the present technology may also be used in other electrochemical devices that cycle lithium ions, such as handheld electronic devices or energy storage systems (ESS).

General Electrochemical Cell Function, Structure, and Composition

By way of background, an exemplary and schematic illustration of an electrochemical cell (also referred to as a battery) 20 is shown in FIG. 1. Although the illustrated examples include a single positive electrode or cathode and a single negative electrode or anode, the skilled artisan will recognize that the present disclosure also contemplates various other configurations, including those having one or more cathodes and one or more anodes, as well as various current collectors with electroactive layers disposed on or adjacent to one or more surfaces thereof.

A typical lithium-ion battery 20 includes a first electrode (such as a negative electrode 22 or anode) opposing a second electrode (such as a positive electrode 24 or cathode) and a separator 26 and/or electrolyte 30 disposed therebetween. While not shown, often in a lithium-ion battery pack, batteries or cells may be electrically connected in a stack or winding configuration to increase overall output. Lithium-ion batteries operate by reversibly passing lithium ions between the first and second electrodes. For example, lithium ions may move from the positive electrode 24 to the negative electrode 22 during charging of the battery, and in the opposite direction when discharging the battery. The electrolyte 30 is suitable for conducting lithium ions and may be in liquid, gel, or solid form.

When a liquid or semi-liquid/gel electrolyte is used, the separator 26 (e.g., a microporous polymeric separator) is thus disposed between the two electrodes 22, 24 and may comprise the electrolyte 30, which may also be present in the pores of the negative electrode 22 and positive electrode 24. When a solid electrolyte is used, the microporous polymeric separator 26 may be omitted. The solid-state electrolyte may also be mixed into the negative electrode 22 and the positive electrode 24. A negative electrode current collector 32 may be positioned at or near the negative electrode 22 and a positive electrode current collector 34 may be positioned at or near the positive electrode 24. An interruptible external circuit 40 and a load device 42 connects the negative electrode 22 (through its current collector 32) and the positive electrode 24 (through its current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte solution 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of transition metal ions, at the positive electrode 24 so that electrons and lithium ions are produced. The lithium ions flow from the negative electrode 22 through the electrolyte 30 across the separator 26 to replenish the positive electrode 24 with lithium for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, the separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. The negative electrode current collector 32 and positive electrode current collector 34 respectively collect and move free electrons to and from an external circuit 40.

Further, as noted above, when a liquid or semi-liquid electrolyte is used, the separator 26 operates as an electrical insulator by being sandwiched between the negative electrode 22 and the positive electrode 24 to prevent physical contact and thus, the occurrence of a short circuit. The separator 26 provides not only a physical and electrical barrier between the two electrodes 22, 24, but also contains the electrolyte solution in a network of open pores during the cycling of lithium ions, to facilitate functioning of the battery 20. The solid-state electrolyte layer may serve a similar ion conductive and electrically insulating function, but without needing a separator 26 component.

The battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the battery 20 may also be a solid-state battery that includes a solid-state electrolyte that may have a different design, as known to those of skill in the art.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

The present technology pertains to making improved electrochemical cells, especially lithium-ion batteries. In various instances, such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of example.

Electrolyte

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous non-aqueous liquid electrolyte 30 solutions may be employed in the lithium-ion battery 20. In certain variations, the electrolyte 30 may include an aqueous solvent (i.e., a water-based solvent) or a hybrid solvent (e.g., an organic solvent including at least 1% water by weight).

Appropriate lithium salts generally have inert anions. Examples of lithium salts that may be dissolved in an organic solvent to form the non-aqueous liquid electrolyte solution include lithium hexafluorophosphate (LiPF$_6$); lithium perchlorate (LiClO$_4$), lithium tetrachloroaluminate (LiAlCl$_4$), lithium iodide (LiI); lithium bromide (LiBr); lithium thiocyanate (LiSCN); lithium tetrafluoroborate (LiBF$_4$); lithium difluorooxalatoborate (LiBF$_2$(C$_2$O$_4$)) (Li-ODFB), lithium tetraphenylborate (LiB(C$_6$H$_5$)$_4$), lithium bis (oxalate)borate (LiB(C$_2$O$_4$)$_2$) (LiBOB); lithium tetrafluorooxalatophosphate (LiPF$_4$(C$_2$O$_4$)) (LiFOP), lithium nitrate (LiNO$_3$), lithium hexafluoroarsenate (LiAsF$_6$); lithium trifluoromethanesulfonate (LiCF$_3$SO$_3$); lithium bis(trifluoromethanesulfonimide) (LITFSI) (LiN(CF$_3$SO$_2$)$_2$); lithium fluorosulfonylimide (LiN(FsO$_2$)$_2$) (LIFSI); and combinations thereof. In certain variations, the electrolyte 30 may include a 1 M concentration of the lithium salts.

These lithium salts may be dissolved in a variety of organic solvents, such as organic ethers or organic carbonates, by way of example. Organic ethers may include dimethyl ether, glyme (glycol dimethyl ether or dimethoxyethane (DME, e.g., 1,2-dimethoxyethane)), diglyme (diethylene glycol dimethyl ether or bis(2-methoxyethyl) ether), triglyme (tri(ethylene glycol) dimethyl ether), additional chain structure ethers, such as 1-2-diethoxyethane, ethoxymethoxyethane, 1,3-dimethoxypropane (DMP), cyclic ethers, such as tetrahydrofuran, 2-methyltetrahydrofuran, and combinations thereof. In certain variations, the organic ether compound is selected from the group consisting of: tetrahydrofuran, 2-methyl tetrahydrofuran, dioxolane, dimethoxy ethane (DME), diglyme (diethylene glycol dimethyl ether), triglyme (tri(ethylene glycol) dimethyl ether), 1,3-dimethoxypropane (DMP), and combinations thereof. Carbonate-based solvents may include various alkyl carbonates, such as cyclic carbonates (e.g., ethylene carbonate (EC), propylene carbonate (PC), butylene carbonate) and acyclic carbonates (e.g., dimethyl carbonate (DMC), diethyl carbonate (DEC), ethyl methyl carbonate (EMC)). Ether-based solvents include cyclic ethers (e.g., tetrahydrofuran, 2-methyltetrahydrofuran, 1,3-dioxolane) and chain structure ethers (e.g., 1,2-dimethoxyethane, 1-2-diethoxyethane, ethoxymethoxyethane).

In various embodiments, appropriate solvents in addition to those described above may be selected from propylene carbonate, dimethyl carbonate, diethyl carbonate, methyl ethyl carbonate, γ-butyrolactone, dimethyl sulfoxide, acetonitrile, nitromethane and mixtures thereof.

Where the electrolyte is a solid-state electrolyte, it may include a compound selected from the group consisting of: $LiTi_2(PO_4)_3$, $LiGe_2(PO_4)_3$, $Li_7La_3Zr_2O_{12}$, $Li_3xLa_{2/3}$-$xTiO_3$, $Li_3PO_4$, $Li_3N$, $Li_4GeS_4$, $Li_{10}GeP_2S_{12}$, $Li_2S$—$P_2S_5$, $Li_6PS5Cl$, $Li_6PS_5Br$, $Li_6PS_5I$, $Li_3OCl$, $Li_{2.99}Ba_{0.005}ClO$, or any combination thereof.

Porous Separator

The porous separator 26 may include, in certain variations, a microporous polymeric separator including a polyolefin, including those made from a homopolymer (derived from a single monomer constituent) or a heteropolymer (derived from more than one monomer constituent), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD® 2500 (a monolayer polypropylene separator) and CELGARD® 2340 (a trilayer polypropylene/polyethylene/polypropylene separator) available from Celgard LLC.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVDF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylene naphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVDF-hexafluoropropylene or (PVDF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, DE)), polyaramides, polyphenylene oxide, cellulosic materials, meso-porous silica, or a combination thereof.

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various commercially available polymers and commercial products for forming the separator 26 are contemplated, as well as the many manufacturing methods that may be employed to produce such a microporous polymer separator 26.

Solid-State Electrolyte

In various aspects, the porous separator 26 and the electrolyte 30 may be replaced with a solid state electrolyte (SSE) that functions as both an electrolyte and a separator. The SSE may be disposed between a positive electrode and a negative electrode. The SSE facilitates transfer of lithium ions, while mechanically separating and providing electrical insulation between the negative and positive electrodes 22, 24. By way of example, SSEs may include $LiTi_2(PO_4)_3$, $LiGe_2(PO_4)_3$, $Li_7La_3Zr_2O_{12}$, $Li_3xLa_{2/3}$-$xTiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, polyethylene oxide (PEO) based polymers, polycarbonates, polyesters, polynitriles (e.g., polyacrylonitrile (PAN)), polyalcohols (e.g., polyvinyl alcohol (PVA)), polyamines (e.g., polyethyleneimine (PEI)), polysiloxane (e.g., polydimethylsiloxane (PDMS)) and fluoropolymers (e.g., polyvinylidene fluoride (PVDF), polyvinylidene fluoride-hexafluoropropylene (PVDF-HFP)), bio-polymers like lignin, chitosan and cellulose, and any combinations thereof.

Current Collectors

The negative and positive electrodes 22, 24 are generally associated with the respective negative and positive electrode current collectors 32, 34 to facilitate the flow of electrons between the electrode and the external circuit 40. The current collectors 32, 34 are electrically conductive and can include metal, such as a metal foil, a metal grid or screen, or expanded metal. Expanded metal current collectors refer to metal grids with a greater thickness such that a greater amount of electroactive material is placed within the metal grid. By way of example, electrically-conductive materials include copper, nickel, aluminum, stainless steel, titanium, alloys thereof, or combinations thereof.

The positive electrode current collector 34 may be formed from aluminum or any other appropriate electrically conductive material known to those of skill in the art. The negative electrode current collector 32 may be formed from copper or any other appropriate electrically conductive material known to those of skill in the art. Negative electrode current collectors do not typically include aluminum because aluminum reacts with lithium, thereby causing large volume expansion and contraction. The drastic volume changes may lead to fracture and/or pulverization of the current collector.

Positive & Negative Electrodes

The positive electrode 24 may be formed from or include a lithium-based active material that can undergo lithium intercalation and deintercalation, alloying and dealloying, or plating and stripping, while functioning as the positive terminal of the lithium-ion battery 20. The positive electrode 24 may include a positive electroactive material. Positive electroactive materials may include one or more transition metal cations, such as manganese (Mn), nickel (Ni), cobalt (Co), chromium (Cr), iron (Fe), vanadium (V), and combinations thereof. However, in certain variations, the positive electrode 24 is substantially free of select metal cations, such as nickel (Ni) and cobalt (Co). Positive electrode materials (also referred to as "positive electroactive materials") are described in greater detail below in the discussion accompanying FIG. 4.

The negative electrode 22 may include a negative electroactive material as a lithium host material capable of functioning as a negative terminal of the lithium-ion battery 20. Common negative electroactive materials include lithium insertion materials or alloy host materials. Negative electrode materials (also referred to as "negative electroactive materials") are described in greater detail below in the discussion accompanying FIG. 4.

In certain aspects, the negative electrode 22 includes metallic lithium and the negative electrode 22 is a lithium metal electrode (LME). The lithium-ion battery 20 may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

Thick Electrodes

As used herein, a "thick electrode" is an electrode (i.e., a single-sided electrode or a one side of a double-sided electrode) having a thickness of greater than or equal to about 100 µm and an areal capacity of greater than or equal to about 5 mAh/cm$^2$. The use of thick electrodes in electrochemical cells may be desirable to increase overall cell energy density, as described above. However, performance of thick electrodes may be hindered when the electrode includes certain binders. For example, some binders coat all or a portion of electroactive material particle surfaces, thereby inhibiting lithium ion passageways between the electroactive material and an electrolyte. This may lead to limited C-rate capability. Additionally, certain binders may undergo physiochemical property changes during solvent evaporation, resulting in a reduction of particle/particle and particle/current collector adhesion in the electrode. This may lead to delamination.

In various aspects, the present disclosure provides an electrode including a polymer binder network. The polymer binder network includes a plurality of fibers. The fibers may generally include repeating units or segments having a hollow, substantially cylindrical shape. In certain aspects, the fibers may be referred to as "'bamboo-type" fibers. For each unit, a wall of the substantially cylindrical shape may include a plurality of beads or dots and a plurality of filaments extending from at least a portion of the beads. The polymer binder network is elastic and robust. The fibers of the binder make point or line contacts (as opposed to a surface coating) with a surface of the electroactive material while permitting flow of lithium ions between the electroactive material surface and the electrolyte. Use of the polymer binder network including the bamboo-type fibers may provide thick electrodes having increased life and performance compared to electrodes including traditional binders and permit cycling of the electrode in an electrochemical cell at a high C-rate.

Figure 2:
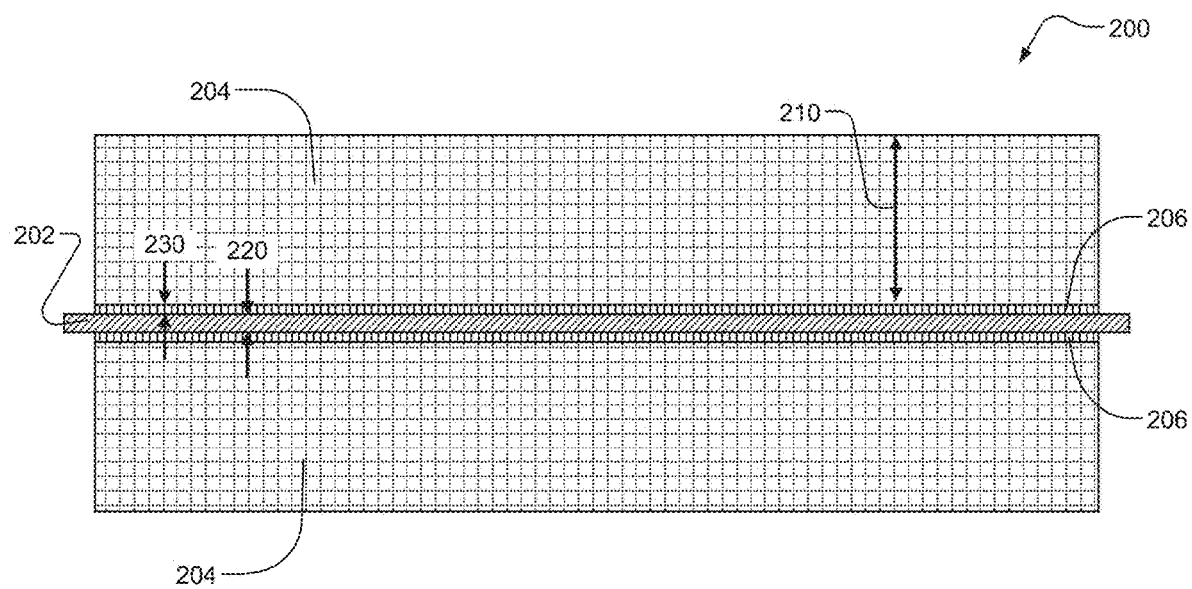
FIG. 2 is a schematic illustration of an electrode assembly for an electrochemical cell according to various aspects of the present disclosure.

With reference to FIG. 2, an electrode component 200 according to various aspects of the present disclosure is provided. The electrode component 200 includes a current collector 202, two electroactive layers 204 (also referred to as "electrodes") and, a two electrically-conductive adhesive layers 206 disposed between the current collector 202 and each of the electroactive layers 204, respectively. Although the electrode component 200 is doubled sided, the present disclosure also provides single-sided electrode components (e.g., a single electroactive layer coupled to one side of a current collector by a single layer of electrically conductive adhesive) and electrodes that are not coupled to current collectors (e.g., a single electroactive layer).

Each of the electroactive layers 204 may be a thick electrode. In certain aspects, each of the electroactive layers 204 may define a first thickness 210 of greater than or equal to about 100 µm, optionally greater than or equal to about 150 µm, optionally greater than or equal to about 200 µm, optionally greater than or equal to about 300 µm, optionally greater than or equal to about 400 µm, optionally greater than or equal to about 500 µm, optionally greater than or equal to about 750 µm, optionally greater than or equal to about 1 mm, optionally greater than or equal to about 1.25 mm, optionally greater than or equal to about 1.5 mm, or optionally greater than or equal to about 1.75 mm. The first thickness 210 may be less than or equal to about 2 mm, optionally less than or equal to about 1.75 mm, optionally less than or equal to about 1.5 mm, optionally less than or equal to about 1.25 mm, optionally less than or equal to about 1 mm, optionally less than or equal to about 750 µm, optionally less than or equal to about 500 µm, optionally less than or equal to about 400 µm, optionally less than or equal to about 300 µm, optionally less than or equal to about 200 µm. In certain aspects, the first thickness 210 may be greater than or equal to about 100 µm to less than or equal to about 2 mm, or optionally greater than or equal to about 150 µm to less than or equal to about 500 µm, by way of example. In certain aspects, the first thickness 210 may vary by about 5% across the electroactive layer 204.

The electroactive layer 204 may define a porosity of greater than or equal to about 25 volume percent, optionally greater than or equal to about 30 volume percent, optionally greater than or equal to about 35 volume percent, optionally greater than or equal to about 40 volume percent, optionally greater than or equal to about 45 volume percent, optionally greater than or equal to about 50 volume percent, optionally greater than or equal to about 55 volume percent. The porosity may be less than or equal to about 60 volume percent, optionally less than or equal to about 55 volume percent, optionally less than or equal to about 50 volume percent, optionally less than or equal to about 45 volume percent, optionally less than or equal to about 40 volume percent, optionally less than or equal to about 35 volume percent, or optionally less than or equal to about 30 volume percent. In certain aspects, the porosity may be greater than or equal to about 25 volume to less than or equal to about 45 volume percent, by way of example.

The current collector 202 may include an electrically-conductive material. The current collector 202 may in a form of a foil or a film, as shown, or a mesh (see, e.g., FIG. 3), by way of example. The electrically-conductive material may include a metal, a carbon-based material, an organic-based material, or a combination thereof, by way of example. In certain aspects, the current collector 202 may include an electrically-conductive material such as those described above in the discussion of FIG. 1. The current collector 202 may define a second thickness 220. The second thickness 220 may be greater than or equal to about 4 μm, optionally greater than or equal to about 6 μm, optionally greater than or equal to about 10 μm, optionally greater than or equal to about 15 μm, optionally greater than or equal to about 20 μm, or optionally greater than or equal to about 25 μm. The second thickness 220 may be less than or equal to about 30 μm, optionally less than or equal to about 25 μm, optionally less than or equal to about 20 μm, optionally less than or equal to about 15 μm, optionally less than or equal to about 10 μm, optionally less than or equal to about 8 μm, or optionally less than or equal to about 6 μm. In an example, the second thickness 220 may be greater than or equal to about 4 μm to less than or equal to about 30 μm, optionally greater than or equal to about 6 μm to less than or equal to about 15 μm, or optionally about 23 μm.

The electrically-conductive adhesive layer 206 may include conductive filler and a polymer. A mass ratio of the conductive filler to the polymer may be greater than or equal to about 0.001, optionally greater than or equal to about 0.01, optionally greater than or equal to about 0.05, optionally greater than or equal to about 0.1, optionally greater than or equal to about 0.2, optionally greater than or equal to about 0.3, or optionally greater than or equal to about 0.4. The mass ratio may be less than or equal to about 0.5, optionally less than or equal to about 0.4, optionally less than or equal to about 0.3, optionally less than or equal to about 0.2, optionally less than or equal to about 0.1, optionally less than or equal to about 0.05, or optionally less than or equal to about 0.01. In certain aspects, the mass ratio may be greater than or equal to about 0.001 to less than or equal to about 0.5.

The conductive filler includes an electrically-conductive material. The electrically-conductive material may include a carbon-based material, a metal, or a combination thereof. In certain aspects, carbon-based materials may include carbon black (e.g., SUPER P made by TIMCAL Belgium), graphene, carbon nanotubes (CNT), carbon nanofibers, or a combination thereof, by way of example. In certain aspects, metal materials may include silver, nickel, aluminum, an alloy thereof, or a combination thereof, by way of example. The polymer may be solvent-resistant and have good adhesive properties. In certain aspects, the polymer may include epoxy, polyimide (PI), polyester, vinyl ester, polyacrylic acid (PAA), one or more thermoplastic polymers (e.g., polyvinylidene fluoride (PVDF), polyamide, silicone, acrylic), or combinations thereof, by way of example.

The electrically-conductive adhesive layer 206 defines a third thickness 230. In certain aspects, the third thickness 230 is greater than or equal to about 0.5 μm, optionally greater than or equal to about 1 μm, optionally greater than or equal to about 5 μm, optionally greater than or equal to about 10 μm, or optionally greater than or equal to about 15 μm. The third thickness 230 may be less than or equal to about 20 μm, optionally less than or equal to about 15 μm, optionally less than or equal to about 10 μm, optionally less than or equal to about 5 μm, or optionally less than or equal to about 1 μm. In certain aspects, the third thickness 230 is greater than or equal to about 0.5 μm to less than or equal to about 20 μm, by way of example. In one example, the electrically-conductive adhesive layer 206 includes an electrically-conductive filler including SUPER P carbon black and a polymer including PAA at a mass ratio of about ⅓. In another example, the electrically-conductive adhesive layer 206 includes an electrically-conductive filler including single-walled carbon nanotubes SWCNT and a polymer including PVDF at a mass ratio of about 0.002.

Each of the electroactive layers 204 may have an areal capacity of greater than or equal to about 5 mAh/cm$^2$, optionally greater than or equal to about 10 mAh/cm$^2$, optionally greater than or equal to about 15 mAh/cm$^2$, optionally greater than or equal to about 20 mAh/cm$^2$, optionally greater than or equal to about 25 mAh/cm$^2$, optionally greater than or equal to about 30 mAh/cm$^2$, optionally greater than or equal to about 35 mAh/cm$^2$, optionally greater than or equal to about 40 mAh/cm$^2$, or optionally greater than or equal to about 45 mAh/cm$^2$. The areal capacity may be less than or equal to about 50 mAh/cm$^2$, optionally less than or equal to about 45 mAh/cm$^2$, optionally less than or equal to about 40 mAh/cm$^2$, optionally less than or equal to about 35 mAh/cm$^2$, optionally less than or equal to about 30 mAh/cm$^2$, optionally less than or equal to about 25 mAh/cm$^2$, optionally less than or equal to about 20 mAh/cm$^2$, optionally less than or equal to about 15 mAh/cm$^2$, or optionally less than or equal to about 10 mAh/cm$^2$. In certain aspects, the areal capacity may be greater than or equal to about 5 mAh/cm$^2$ to less than or equal to about 50 mAh/cm$^2$, optionally about 5 mAh/cm$^2$ to less than or equal to about 10 mAh/cm$^2$. The areal capacity may vary by about 5% across the electroactive layer 200.

A press density (or electrode density) is defined as a volumetric mass density of electrode material (e.g., the admixture of electroactive material, binder, and conductive additive) in the electrode. In certain aspects, the press density of each of the electroactive layers 204 may generally be greater than or equal to about 1 g/cm$^3$ to less than or equal to about 4 g/cm$^3$. A variation in press density may be about 3%. In certain aspects, the electroactive layer 204 is a positive electroactive layer and the press density is greater than or equal to about 2 g/cm$^3$ to less than or equal to about 4 g/cm$^3$, or optionally greater than or equal to about 3.3 g/cm$^3$ to less than or equal to about 3.7 g/cm$^3$. In certain aspects, the electroactive layer 204 is a negative electroactive layer and the press density is greater than or equal to about 1 g/cm$^3$ to less than or equal to about 3 g/cm$^3$, or optionally greater than or equal to about 1.4 g/cm$^3$ to less than or equal to about 2 g/cm$^3$.

Figure 3:
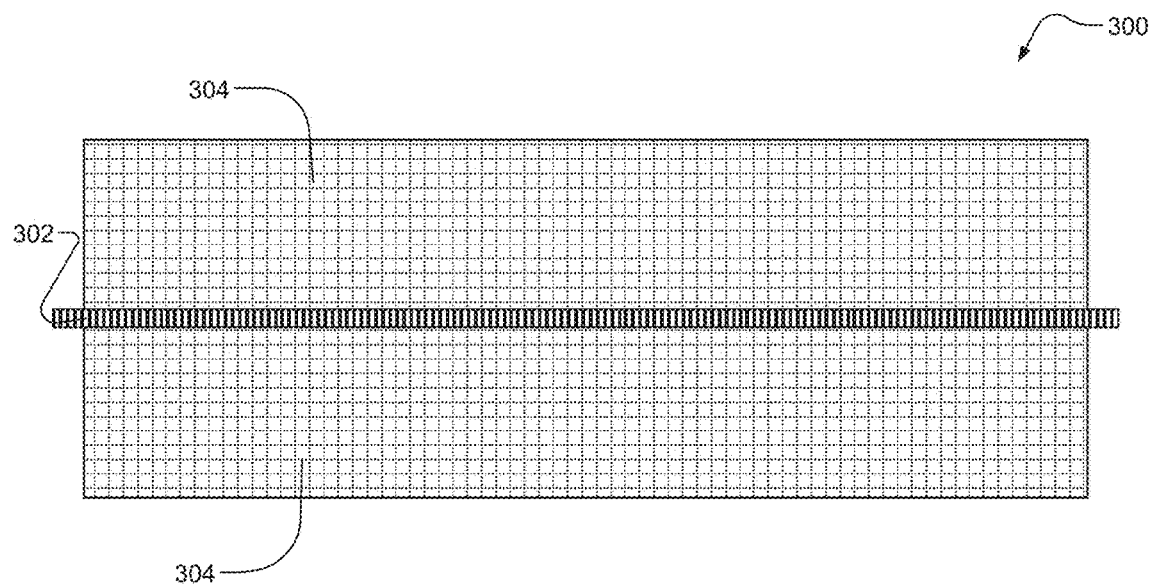
FIG. 3 is a schematic illustration of another electrode assembly for an electrochemical cell according to various aspects of the present disclosure.

Referring to FIG. 3, another electrode component 300 according to various aspects of the present disclosure is provided. The electrode component 300 includes a current collector 302 and two electroactive layers 304 on opposing sides of the current collector 302. The electroactive layers 304 may be the same as the electroactive layers 204 of FIG. 2. In certain aspects, the electrode component 300 may be free of an electrically-conductive adhesive such that the electroactive layers 304 are in direct contact with the current collector 302. The current collector 302 may be the same as the current collector 202 of FIG. 2 except as described below.

The current collector 302 may be porous or mesh. The current collector 302 may define a porosity of greater than or equal to about 0.01 volume percent, optionally greater than or equal to about 0.1 volume percent, optionally greater than or equal to about 1 volume percent, optionally greater than or equal to about 5 volume percent, optionally greater than or equal to about 10 volume percent, optionally greater than or equal to about 15 volume percent, optionally greater than or equal to about 20 volume percent, optionally greater than or equal to about 25 volume percent, optionally greater than or equal to about 30 volume percent, optionally greater than or equal to about 35 volume percent, optionally greater than or equal to about 40 volume percent, or optionally greater than or equal to about 45 volume percent. The porosity may be less than or equal to about 50 volume percent, optionally less than or equal to about 45 volume percent, optionally less than or equal to about 40 volume percent, optionally less than or equal to about 35 volume percent, optionally less than or equal to about 30 volume percent, optionally less than or equal to about 25 volume percent, optionally less than or equal to about 20 volume percent, optionally less than or equal to about 15 volume percent, optionally less than or equal to about 10 volume percent, optionally less than or equal to about 5 volume percent, optionally less than or equal to about 1 volume percent, or optionally less than or equal to about 0.1 volume percent. In certain aspects, the porosity is greater than or equal to about 0.01 volume percent to less than or equal to about 50 volume percent, by way of example.

The current collector 302 may define an average pore size of greater than or equal to about 5 µm, optionally greater than or equal to about 10 µm, optionally greater than or equal to about 25 µm, optionally greater than or equal to about 50 µm, optionally greater than or equal to about 100 µm, optionally greater than or equal to about 150 µm, optionally greater than or equal to about 200 µm, optionally greater than or equal to about 250 µm, optionally greater than or equal to about 300 µm, optionally greater than or equal to about 350 µm, optionally greater than or equal to about 400 µm, or optionally greater than or equal to about 450 µm. The pore size may be less than or equal to about 500 µm, optionally less than or equal to about 450 µm, optionally less than or equal to about 400 µm, optionally less than or equal to about 350 µm, optionally less than or equal to about 300 µm, optionally less than or equal to about 250 µm, optionally less than or equal to about 200 µm, optionally less than or equal to about 150 µm, optionally less than or equal to about 100 µm, optionally less than or equal to about 50 µm, optionally less than or equal to about 25 µm, or optionally less than or equal to about 10 µm. In certain aspects, the pore size is greater than or equal to about 5 µm to less than or equal to about 500 µm, by way of example.

Figure 4:
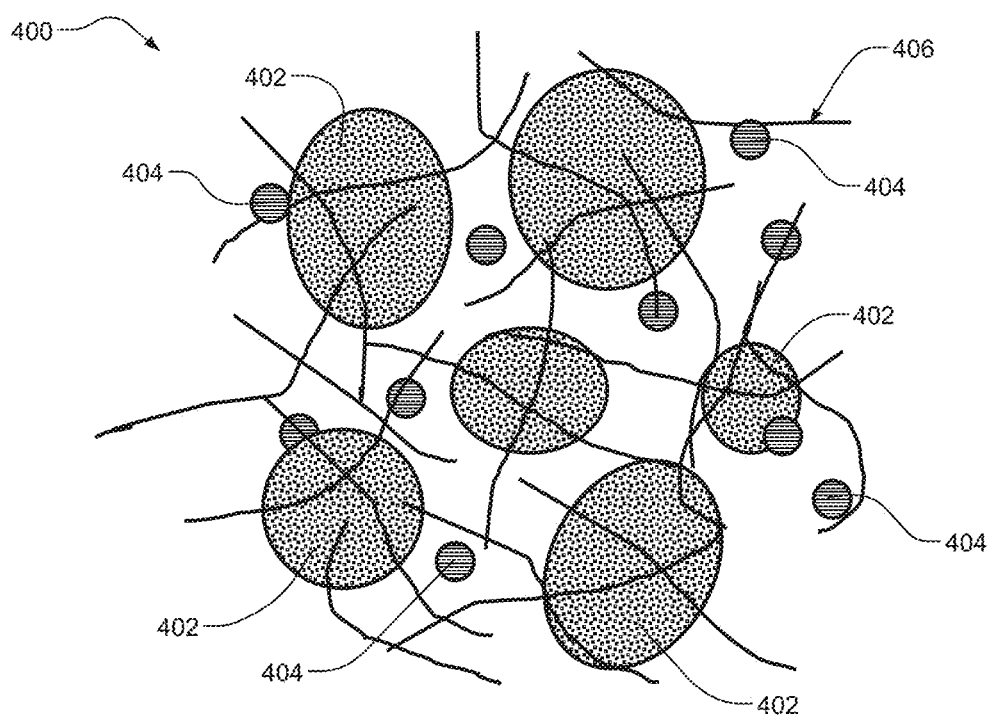
FIG. 4 is a partial schematic view of an electrode according to various aspects of the present disclosure, the electrode including a polymer binder network, electroactive material particles, and an electrically-conductive material.

With reference to FIG. 4, a portion of an electroactive layer 400 according to various aspects of the present disclosure is provided. The electroactive layer 400 may be the same as or similar to the electroactive layer 204 of FIG. 2 and/or the electroactive layer 304 of FIG. 3. The electroactive layer 400 includes a plurality of electroactive material particles 402, a plurality of electrically-conductive particles 404, and a polymer binder network 406. In certain other aspects, an electroactive layer 400 may include the electroactive material particles 402 and the polymer binder network 406, but be substantially free of an electrically-conductive material.

Electroactive Material

The electroactive layer 400 may include the electroactive material particles 402 in an amount greater than or equal to about 80 weight percent, optionally greater than or equal to about 85 weight percent, optionally greater than or equal to about 90 weight percent, or optionally greater than or equal to about 96 weight percent. The electroactive layer 400 may include the electroactive material particles 402 in an amount less than or equal to about 98 weight percent, optionally less than or equal to about 96 weight percent, optionally less than or equal to about 90 weight percent, or optionally less than or equal to about 85 weight percent. In certain aspects, the electroactive layer 400 may include the electroactive material particles 402 in an amount greater than or equal to about 80 weight percent to less than or equal to about 98 weight percent, by way of example.

The electroactive material particles 402 may include a positive electroactive material (also referred to as a "cathode material") or a negative electroactive material (also referred to as an "anode material").

In certain aspects, the positive electroactive materials are selected from an olivine compound, a rock salt, cobalt-free layered oxide, a rock salt layered oxide, a spinel, a tavorite, a borate, a silicate, an organic compound, other types of positive electrode materials, or any combination thereof. The olivine compound may include $LiV_2(PO_4)_3$, $LiFePO_4$ (LFP), $LiCoPO_4$, and/or a lithium manganese iron phosphate (LMFP), by way of example. LMFPs may include $LiMnFePO_4$ and/or $LiMn_xFe_{1-x}PO_4$, where $0 \le x \le 1$, by way of example. Examples of $LiMn_xFe_{1-x}PO_4$, where $0 \le x \le 1$, include $LiMn_{0.7}Fe_{0.3}PO_4$, $LiMn_{0.6}Fe_{0.4}PO_4$, $LiMn_{0.8}Fe_{0.2}PO_4$, and $LiMn_{0.75}Fe_{0.25}PO_4$, by way of example. The rock salt, cobalt-free layered oxide may include $LiNi_xMn_{1-x}O_2$ (e.g., $LiNi_{0.75}Mn_{0.25}O_2$ NM75) and/or $LiNi_xMn_yAl_{1-x-y}O_2$ (e.g., $LiNi_{0.94}Mn_{0.04}Al_{0.02}O_2$ NMA), by way of example. The rock salt layered oxide may include $LiNi_xMn_yCo_{1-x-y}O_2$, $LiNi_xMn_{1-x}O_2$, $Li_{1+x}MO_2$, (e.g., $LiCoO_2$, $LiNiO_2$, $LiMnO_2$, and/or $LiNi_{0.5}Mn_{0.5}O_2$), a lithium nickel manganese cobalt oxide (NMC) (e.g., NMC 111, NMC 523, NMC 622, NMC 721, and/or NMC 811), a lithium nickel manganese cobalt aluminum oxide (NMCA), and/or a lithium nickel cobalt aluminum oxide (NCA), by way of example. The spinel may include $LiMn_2O_4$ and/or $LiNi_{0.5}Mn_{1.5}O_4$, by way of example. The tavorite compound may include $LiVPO_4F$, by way of example. The borate compound may include $LiFeBO_3$, $LiCoBO_3$, and/or $LiMnBO_3$, by way of example. The silicate compound may include $Li_2FeSiO_4$, $Li_2MnSiO_4$, and/or $LiMnSiO_4F$, by way of example. The organic compound may include dilithium (2,5-dilithiooxy)terephthalate (as described in Stéven Renault, Sébastien Gottis, Anne-Lise Barrés, Matthieu Courty, Oliver Chauvet, Franck Dolhem, and Philippe Poizot, *A Green Li-Organic Battery Working as a Fuel Cell in Case of Emergency*, ELEC. SUPPLEMENTARY INFO. FOR ENERGY & ENVTL. SCI. (2013), incorporated herein by reference in its entirety), and/or polyimide, by way of example. An example of another type of positive electroactive material is a sulfur-containing material, such as sulfur.

Some positive electroactive materials, such as olivine compounds, rock salt, cobalt-free layered oxides, rock salt layered oxides, and/or spinels, may be a coated and/or doped. Dopants can include magnesium (Mg), aluminum (Al), yttrium (Y), scandium (Sc), and the like. In certain aspects, a positive electroactive material including an LMFP compound may be doped with about 10% by weight of one or more dopants.

In certain aspects, the negative electroactive materials are selected from a carbonaceous material (e.g., CNTs, graphite and/or graphene), a lithium-containing material (e.g., lithium and/or a lithium alloy), a tin-containing material (e.g., tin and/or a tin alloy), a lithium titanium oxide (e.g., $Li_4Ti_5O_{12}$), a metal oxide (e.g., $V_2O_5$, $SnO_2$, and/or $Co_3O_4$), a metal sulfide (e.g., FeS), a silicon-containing material (e.g., silicon, silicon oxide, a silicon alloy, silicon-graphite, silicon oxide graphite, and/or silicon alloy graphite, any of which may optionally be lithiated), or any combination thereof.

Electrically-Conductive Material

The electroactive layer 400 may include the electrically-conductive material 404 in an amount greater than or equal to about 0.5 weight percent, optionally greater than or equal to about 1 weight percent, optionally greater than or equal to about 5 weight percent, or optionally greater than or equal to about 10 weight percent. The electroactive layer 400 may include the electrically-conductive material 404 in an amount less than or equal to about 15 weight percent, optionally less than or equal to about 10 weight percent, optionally less than or equal to about 5 weight percent, or optionally less than or equal to about 1 weight percent. In certain aspects, the electroactive layer 400 may include the electrically-conductive material 404 in an amount greater than or equal to about 0.5 weight percent to less than or equal to about 15 weight percent, by way of example.

The electrically-conductive material 404 may include any of the electrically-conductive materials described in the discussion accompanying FIG. 1. Additionally or alternatively, in certain aspects, the electrically-conductive material 404 may include a carbon-based material, a metal (e.g., a metal wire), a metal oxide, or any combination thereof. Carbon-based materials may include carbon black (e.g., SUPER P carbon black made by TIMCAL Belgium and/or a KETJENBLACK carbon black), graphene, carbon nanotubes (CNT), carbon nanofibers, or a combination thereof, by way of example. In certain aspects, metal materials may include silver, nickel, aluminum, an alloy thereof, or a combination thereof, by way of example. The metal oxide may include a simple oxide, such $RuO_2$, $SnO_2$, ZnO, and/or $Ge_2O_3$, a superconductive oxide, such as $YBa_2Cu_3O_7$ and/or $La_{0.75}Ca_{0.25}MnO_3$, or a combination thereof, by way of example.

Polymer Binder Network

The electroactive layer 400 may include the polymer binder network (i.e., the polymer of the polymer binder network 406) in an amount greater than or equal to about 0.5 weight percent, optionally greater than or equal to about 8 weight percent, optionally greater than or equal to about 0.75 weight percent, optionally greater than or equal to about 1 weight percent, optionally greater than or equal to about 2 weight percent, optionally greater than or equal to about 5 weight percent, or optionally greater than or equal to about 8 weight percent. The electroactive layer 400 may include the polymer binder network in an amount less than or equal to about 10 weight percent, optionally less than or equal to about 8 weight percent, optionally less than or equal to about 5 weight percent, optionally less than or equal to about 2 weight percent, optionally less than or equal to about 1 weight percent, or optionally less than or equal to about 0.75 weight percent. In certain aspects, the electroactive layer 400 may include the polymer binder network 406 in an amount greater than or equal to about 0.5 weight percent to less than or equal to about 10 weight percent, or optionally greater than or equal to about 0.75 weight percent to less than or equal to about 2 weight percent, by way of example.

The polymer binder network 406 includes a polymer. The polymer may be elastic and robust. In certain aspects, the polymer includes polytetrafluoroethylene (PTFE), PVDF, perfluoroalkoxy alkane (PFA), fluorinated ethylene propylene (FEP), ethylene chlorotrifluoroethylene (ECTFE), ethylene tetrafluoroethylene (ETFE), or combinations thereof. In certain aspects, the polymer binder network 406 consists essentially of the polymer.

Figure 5:
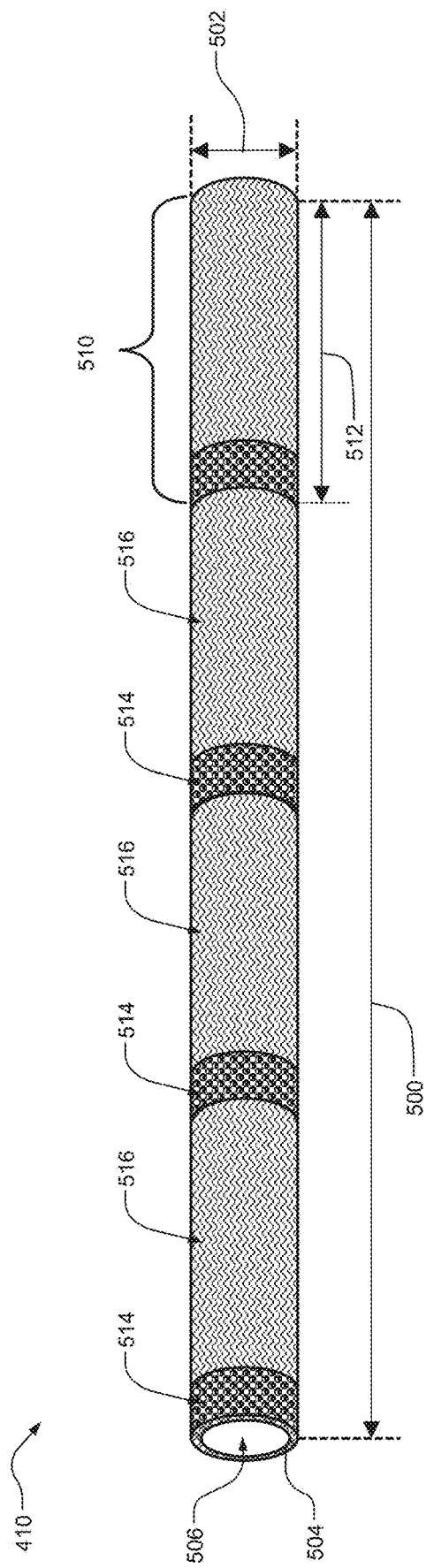

The polymer binder network 406 includes a plurality of fibers 410. At least a portion of the fibers 410 are in direct contact with surfaces of the electroactive material particles 402. Referring to FIG. 5, one of the plurality of fibers 410 according to various aspects of the present disclosure is provided. Although the fiber 410 of FIG. 5 is shown as being linear, the fiber 410 need not be linear and may be provided in a variety of shapes to form the polymer binder network 406, as shown in FIG. 4.

Each of the fibers 410 defines a first length 500 of greater than or equal to about 5 μm, optionally greater than or equal to about 10 μm, optionally greater than or equal to about 20 μm, optionally greater than or equal to about 50 μm, optionally greater than or equal to about 100 μm, optionally greater than or equal to about 500 μm, optionally greater than or equal to about 1 mm, optionally greater than or equal to about 5 mm, optionally greater than or equal to about 10 mm, optionally greater than or equal to about 50 mm, optionally greater than or equal to about 100 mm, optionally greater than or equal to about 500 mm, or optionally greater than or equal to about 1 cm, or optionally greater than or equal to about 1.5 cm. The first length 500 may be less than or equal to about 2 cm, optionally less than or equal to about 1.5 cm, optionally less than or equal to about 1 cm, optionally less than or equal to about 500 mm, optionally less than or equal to about 100 mm, optionally less than or equal to about 50 mm, optionally less than or equal to about 10 mm, optionally less than or equal to about 5 mm, optionally less than or equal to about 1 mm, optionally less than or equal to about 500 μm, optionally less than or equal to about 100 μm, optionally less than or equal to about 50 μm, optionally less than or equal to about 20 μm, or optionally less than or equal to about 10 μm. In certain aspects, the first length 500 may be greater than or equal to about 5 μm to less than or equal to about 2 cm, or optionally greater than or equal to about 20 μm to less than or equal to about 500 μm, by way of example.

Each of the fibers 410 defines a first diameter 502. The first diameter 502 may be greater than or equal to about 0.1 μm, optionally greater than or equal to about 0.5 μm, optionally greater than or equal to about 1 μm, optionally greater than or equal to about 5 μm, optionally greater than or equal to about 10 μm, optionally greater than or equal to about 20 μm, optionally greater than or equal to about 50 μm, optionally greater than or equal to about 75 μm, optionally greater than or equal to about 100 μm, optionally greater than or equal to about 200 μm, optionally greater than or equal to about 300 μm, or optionally greater than or equal to about 400 μm. The first diameter 502 may be less than or equal to about 500 μm, optionally less than or equal to about 400 μm, optionally less than or equal to about 300 μm, optionally less than or equal to about 200 μm, optionally less than or equal to about 100 μm, optionally less than or equal to about 75 μm, optionally less than or equal to about 50 μm, optionally less than or equal to about 20 μm, optionally less than or equal to about 10 μm, optionally less than or equal to about 5 μm, optionally less than or equal to about 1 μm, optionally less than or equal to about 0.5 μm. In certain aspects, the first diameter 502 may be greater than or equal to about 0.1 μm to less than or equal to about 500 μm.

Each of the fibers 410 may generally include a wall 504. The wall 504 may be a hollow cylindrical wall. In certain aspects, the wall 504 may have a substantially circular cross section, as shown, a substantially rectangular cross section (e.g., a substantially square cross section), or any other closed polygon cross section. The wall 504 may at least partially define an interior region 506.

Each of the fibers 410 may include a plurality of repeating units or segments 510. Each of the units 510 may include the wall 504 and the interior region 506. The units 510 may be arranged end-to-end and physically connected to one another. Accordingly, in light of the hollow cylindrical structure including repeating units, the fibers 410 may be referred to as bamboo-type fibers. The units 510 may have similar structures and characteristics without being identical.

Each of the units 510 defines a second length 512. The second length 512 may be greater than or equal to about 0.1 µm, optionally greater than or equal to about 0.5 µm, optionally greater than or equal to about 1 µm, optionally greater than or equal to about 2 µm, optionally greater than or equal to about 5 µm, optionally greater than or equal to about 8 µm, optionally greater than or equal to about 10 µm, optionally greater than or equal to about 20 µm, optionally greater than or equal to about 30 µm, or optionally greater than or equal to about 40 µm. The second length 512 may be less than or equal to about 50 µm, optionally less than or equal to about 40 µm, optionally less than or equal to about 30 µm, optionally less than or equal to about 20 µm, optionally less than or equal to about 10 µm, optionally less than or equal to about 8 µm, optionally less than or equal to about 5 µm, optionally less than or equal to about 2 µm, optionally less than or equal to about 1 µm, or optionally less than or equal to about 0.5 µm. In certain aspects, the second length 512 may be greater than or equal to about 0.1 µm to less than or equal to about 50 µm, by way of example.

Figure 6:
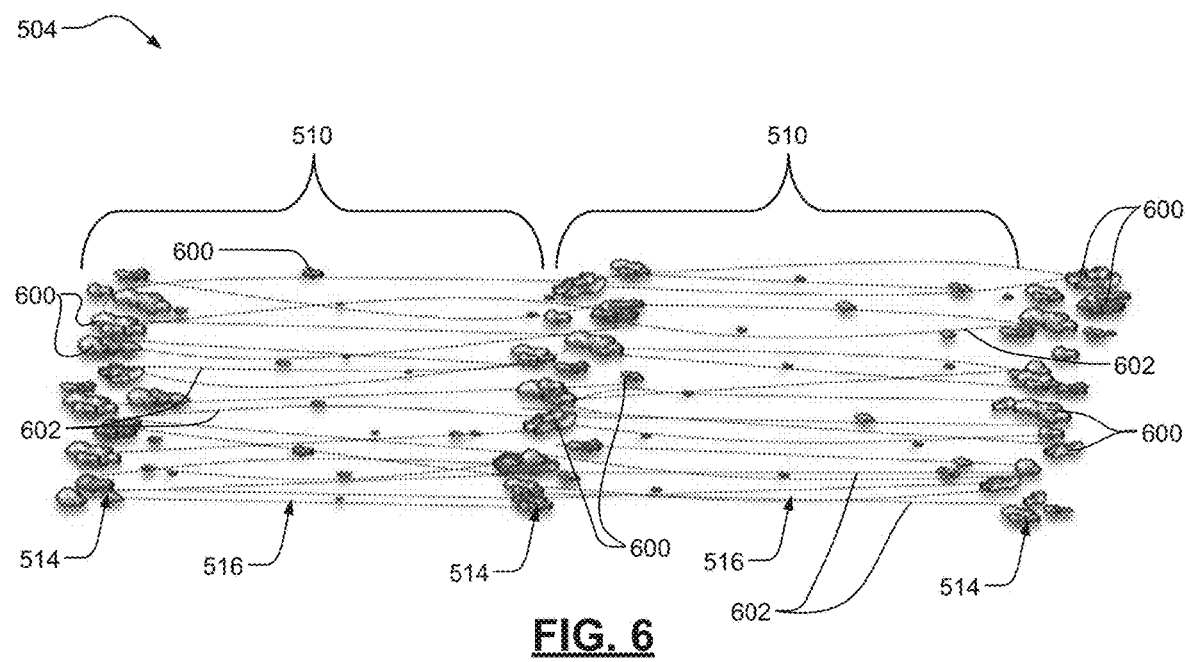
FIG. 6 is a partial perspective view of a wall of the fiber of FIG. 5 according to various aspects of the present disclosure.

Each of the units 510 may include a first portion 514 and a second portion 516. With reference to FIG. 6, the first portion 514 includes a plurality of dots or beads 600. The second portion 516 includes a plurality a filaments 602 (which may be microfibers). In certain aspects, boundaries between the first and second portions 514, 516 are not rigid and the first portion 514 may also include filaments 612 and/or the second portion 516 may also include beads 600, as shown. Moreover, a longitudinal location (i.e., parallel to the first and second lengths 500, 512, shown in FIG. 5) of the first and second portions 514, 516 may vary about circumference of the wall 504.

The filaments 602 extend from at least a portion of the beads 600. Together, the beads 600 and filaments 602 make up the wall 504. In certain aspects, during cycling of an electrochemical cell including the electroactive layer 400 (FIG. 4), the fibers 410 (FIGS. 4-5) may be configured to be further fibrillated such that a portion of the beads 600 are stretched into filaments 602. For example, fibrillation during cycling may occur when the electroactive material particles 402 (FIG. 4) (e.g., including silicon) undergo volume swelling during a lithiation process.

In certain aspects, the beads 600 may define an irregular shape. The beads 600 may have an average second diameter of greater than or equal to about 10 nm, optionally greater than or equal to about 20 nm, optionally greater than or equal to about 50 nm, optionally greater than or equal to about 100 nm, optionally greater than or equal to about 250 nm, optionally greater than or equal to about 500 nm, or optionally greater than or equal to about 750 nm. The average second diameter may be less than or equal to about 1 µm, optionally less than or equal to about 750 nm, optionally less than or equal to about 500 nm, optionally less than or equal to about 250 nm, optionally less than or equal to about 100 nm, optionally less than or equal to about 50 nm, or optionally less than or equal to about 20 nm. In certain aspects, the average second diameter may be greater than or equal to about 10 nm to less than or equal to about 1 µm. In other aspects, the beads 600 may define a substantially spherical shape and/or an elongated spherical shape.

The filaments 602 may define an average third diameter of greater than or equal to about 1 nm, optionally greater than or equal to about 2 nm, optionally greater than or equal to about 5 nm, optionally greater than or equal to about 10 nm, optionally greater than or equal to about 25 nm, optionally greater than or equal to about 50 nm, optionally greater than or equal to about 100 nm, optionally greater than or equal to about 150 nm, optionally greater than or equal to about 200 nm, or optionally greater than or equal to about 250 nm. The average third diameter may be less than or equal to about 300 nm, optionally less than or equal to about 250 nm, optionally less than or equal to about 200 nm, optionally less than or equal to about 150 nm, optionally less than or equal to about 100 nm, optionally less than or equal to about 50 nm, optionally less than or equal to about 20 nm, optionally less than or equal to about 10 nm, optionally less than or equal to about 5 nm, or optionally less than or equal to about 2 nm. In certain aspects, the average third diameter may be greater than or equal to about 1 nm to less than or equal to about 300 nm.

EXAMPLE

Figure 7:
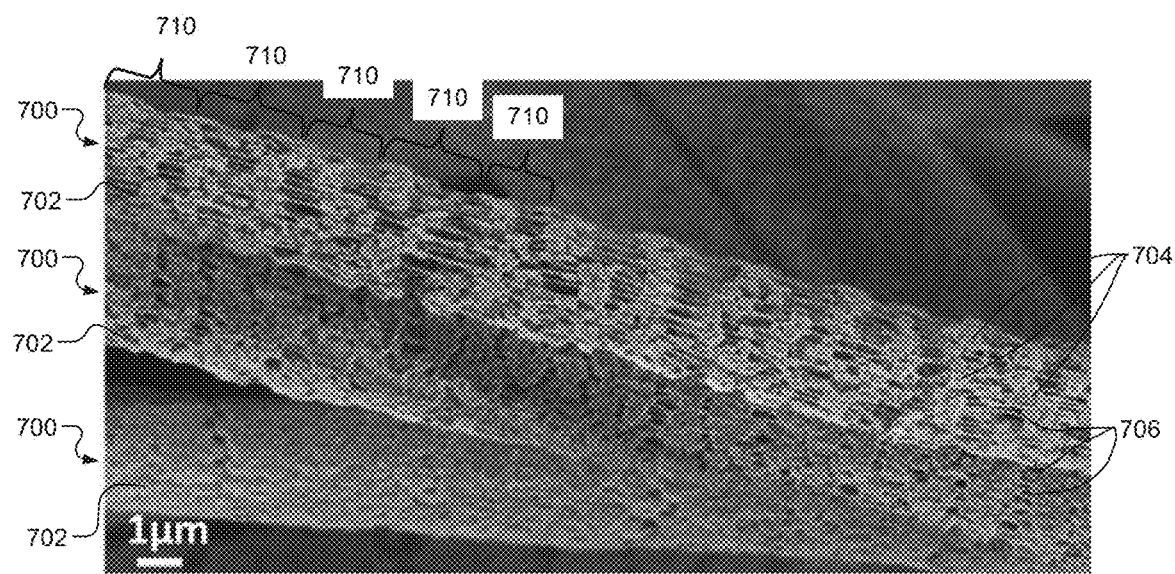
FIG. 7 is a scanning electron microscope image of a portion of a plurality of polymer binder fibers according to various aspects of the present disclosure.

Referring to FIG. 7, a plurality of polymer binder fibers 700 according to various aspects of the present disclosure are provided. Each of the polymer binder fibers 700 includes a wall 702 at least partially defining an interior region (not shown). The wall 702 includes a plurality of dots or beads 704 and a plurality of filaments or microfibers 706. Each of the fibers 700 may generally include a plurality of end-to-end repeating units or segments 710.

Methods of Manufacturing a Thick Electrode

Figure 8:
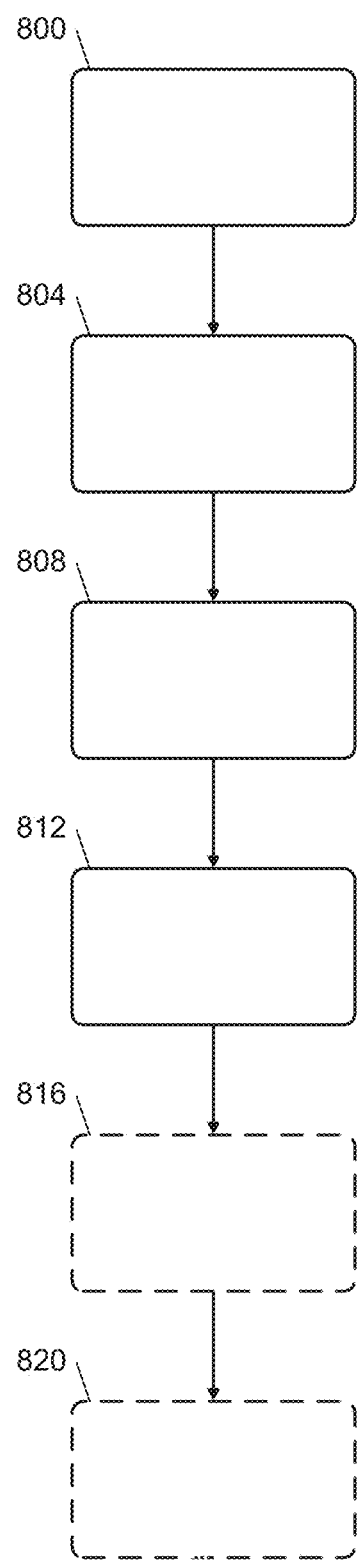
FIG. 8 is a flowchart depicting a method of manufacturing an electrode according to the principles of the present disclosure.

With reference to FIG. 8, a method of making an electrode, such as the electroactive layer 200, 300, and/or 400, according to various aspects of the present disclosure is provided. The method generally includes preparing an admixture of an electroactive material, a polymer binder, and optionally an electrically-conductive material at 800, depositing the admixture onto a substrate at 804, pre-rolling the admixture on the substrate to form an electrode precursor, final-rolling the electrode precursor to form a continuous electrode film at 812, optionally fixing the continuous electrode film to a current collector at 816 to form a continuous electrode component, and optionally cutting the continuous electrode component to form individual electrode components at 820.

Figure 9:
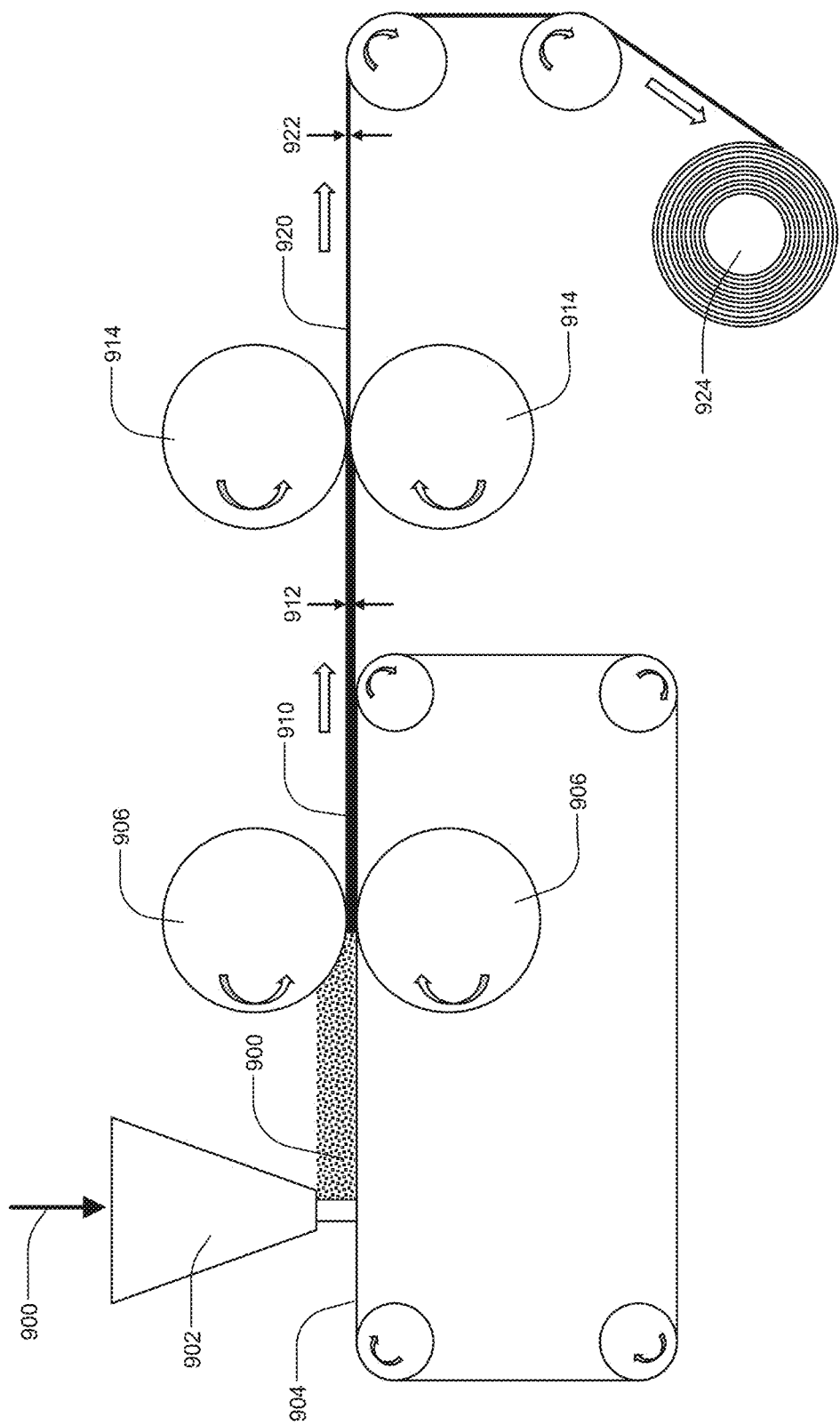
FIG. 9 is an example implementation of the method of FIG. 8 according to various aspects of the present disclosure.

With reference to FIG. 9, example of the method of FIG. 8 according to various aspects of the present disclosure is provided. An admixture 900 may be provided to a hopper 902. The admixture 900 may include an electroactive material, a polymer binder, and optionally an electrically conductive material, such as those described above in the discussion of FIGS. 4-6. The polymer binder may be at least partially fibrillated such that it includes a plurality of dots or beads and a plurality of filaments prior to formation of the electrode or cycling of the electrode in an electrochemical cell. Preparation of the admixture 900 may be performed prior to introduction of the admixture 900 into the hopper 902. The admixing may be performed in any commercially-available mixer (not shown). Additionally or alternatively, the admixture may be prepared in the hopper 902.

The admixture 900 may be discharged from the hopper 902 and deposited onto a surface of a moving substrate 904. The admixture 900 may be conveyed on the moving substrate 904 toward a first pair of rollers 906. The first pair of rollers 906 may pre-roll the admixture 900 to form a continuous electrode precursor 910. The continuous electrode precursor 910 may define a first thickness 912.

The continuous electrode precursor 910 may be conveyed toward a second pair of rollers 914. In certain aspects, the electrode continuous precursor 910 may be removed from the substrate 904 between the first pair of rollers 906 and the second pair of rollers 914. The second pair of rollers 914 may final-roll the continuous electrode precursor 910 to form a continuous electrode film 920. The continuous electrode film 920 may define a second thickness 922 less than the first thickness 912.

The continuous electrode film 920 may be wound onto a roll 924. Before or after being wound onto the roll 924, the continuous electrode film 920 may be fixed to a continuous current collector (e.g., a foil or mesh) to form a continuous electrode component. In one example, fixing the continuous electrode film 920 to the continuous current collector may include applying an electrically-conductive adhesive between the continuous electrode film 920 and the continuous current collector, such as when the continuous current collector is a foil. In another example, fixing the continuous electrode film 920 to the continuous current collector may include pressing the continuous electrode film 920 onto the continuous current collector, such as when the continuous current collector is a mesh.

The continuous electrode film 920 (or continuous electrode component) may optionally be cut into individual sheets to form individual electrode films (or individual electrode components). The optional cutting may be performed before or after the optional fixing of the electrode film to the current collector. Although FIG. 9 depicts a continuous process, the method of FIG. 8 may also be performed as a batch process.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. An electrode for an electrochemical cell comprising:
a polymer binder network including,
a plurality of fibers defining the polymer binder network, each of the plurality of fibers including
a plurality of segments arranged end-to-end and physically connected to one another, each of the plurality of segments including,
a plurality of beads, and
a plurality of filaments extending from at least a portion of the plurality of beads, respectively; and
a plurality of electroactive material particles in voids of the polymer binder network.

2. The electrode of claim 1, wherein each of the plurality of segments defines a length of greater than or equal to about 0.1 micrometers to less than or equal to about 50 micrometers.

3. The electrode of claim 1, wherein
each of the plurality of segments includes a substantially cylindrical wall defining an interior region.

4. The electrode of claim 3, wherein the substantially cylindrical wall defines a diameter of greater than or equal to about 0.1 micrometers to less than or equal to about 500 micrometers.

5. The electrode of claim 1, wherein each of the plurality of fibers defines a length of greater than or equal to about 5 micrometers to less than or equal to about 2 cm.

6. The electrode of claim 1, wherein
each of the plurality of beads defines a diameter of greater than or equal to about 10 nm to less than or equal to about 1 micrometer, and
each of the plurality of filaments defines a diameter of greater than or equal to about 1 nm to less than or equal to about 300 nm.

7. The electrode of claim 1, wherein the electrode defines a thickness of greater than or equal to about 100 micrometers to less than or equal to about 2 mm.

8. The electrode of claim 1, wherein the polymer binder network is present at greater than or equal to about 0.5 weight percent to less than or equal to about 10 weight percent.

9. The electrode of claim 1, wherein the electrode has an areal capacity of greater than or equal to about 5 mAh/cm$^2$ to less than or equal to about 50 mAh/cm$^2$.

10. The electrode of claim 1, wherein
(i) the plurality of electroactive material particles comprise a positive electroactive material and the electrode has a press density of greater than or equal to about 2 g/cm$^3$ to less than or equal to about 4 g/cm$^3$, or
(ii) the plurality of electroactive material particles comprise a negative electroactive material and the electrode has a press density of greater than or equal to about 1 g/cm$^3$ to less than or equal to about 3 g/cm$^3$.

11. The electrode of claim 1, wherein the electrode defines a porosity of greater than or equal to about 25 volume percent to less than or equal to about 60 volume percent.

12. The electrode of claim 1, wherein at least a portion of the plurality of beads are configured to be fibrillated during cycling of an electrochemical cell including the electrode.

13. The electrode of claim 1, wherein the polymer binder network comprises polytetrafluoroethylene (PTFE).

14. The electrode of claim 1, further comprising:
an electrically-conductive material.

15. The electrode of claim 1, wherein the plurality of electroactive material particles includes one of:
(i) a positive electroactive material selected from the group consisting of: an olivine compound, a rock salt, cobalt-free layered oxide, a rock salt layered oxide, a spinel, a tavorite, a borate, a silicate, an organic compound, sulfur, or any combination thereof, or
(ii) a negative electroactive material selected from the group consisting of: a carbonaceous material, a lithium-containing material, a tin-containing material, a lithium titanium oxide, a metal oxide, a metal sulfide, a silicon-containing material, a lithiated silicon-containing material, or any combination thereof.

16. An electrode component comprising:
a current collector comprising an electrically-conductive material; and an electrode layer on the current collector, the electrode layer comprising,
a polymer binder network including,
a plurality of fibers defining the polymer binder network, each of the plurality of fibers including,
a plurality of segments arranged end-to-end and physically connected to one another, each of the plurality of segments including,
a plurality of beads, and
a plurality of filaments extending from at least a portion of the plurality of beads, respectively, and
a plurality of electroactive material particles in voids of the binder polymer network.

17. The electrode component of claim 16, wherein the current collector comprises a mesh and the electrode layer is in direct contact with the mesh.

18. The electrode component of claim 16, further comprising:
an electrically-conductive adhesive between the current collector and the electrode layer.

19. A method of making an electrode for an electrochemical cell, the method comprising:
preparing an admixture by admixing a plurality of electroactive material particles with a plurality of polymer binder fibers, each of the plurality of polymer binder fibers including a plurality of segments arranged end-to-end and physically connected to one another, each of the plurality of segments including a plurality of beads and a plurality of filaments extending from at least a portion of the plurality of beads;
depositing the admixture onto a substrate;
pre-rolling the admixture on the substrate to form a film precursor comprising the admixture and defining a first thickness; and
forming the electrode by final-rolling the film precursor to define a second thickness less than the first thickness.

20. The electrode component of claim 16, wherein at least a portion of the plurality of beads are configured to be fibrillated during cycling of an electrochemical cell including the electrode component.

* * * * *